INVENTOR.

Willi Schraub 3,220,096
METHOD OF MAKING A GUIDING ARRANGEMENT FOR CARRIAGES ON MACHINE TOOLS AND THE LIKE
Willi Schraub, Beckrath, Wickrath-Niers, Germany, assignor to Scharmann & Co., Rheydt, Rhineland, Germany
Filed July 5, 1961, Ser. No. 121,956
Claims priority, application Germany, July 5, 1960, Sch 28,115
2 Claims. (Cl. 29—148.4)

The present invention concerns a method of providing guiding means for carriages on machine tools and the like. Such guiding means usually consist of an intermediate cast guiding member having screwed thereon a hardened and ground guiding rail. The two lateral surfaces of such guiding rail which are ground precisely parallel to each other then guide the carriage or the like that is to be guided by the guide means by means of guiding rollers which for purposes of a play-free adjustment may have their axles or studs eccentrically located in the carriage.

In order to assure a precise guiding of the carriage, the guiding rail must consist of a high grade hard material. Such material, however, is not only very expensive but also the machining of such material involves considerable costs because it either requires considerable time or causes high grade tools to wear relatively rapidly. Thus, the drilling and sinking of the numerous screw threads for the passage of the screws intended to connect the steel rail to the cast intermediate member is time consuming work and requires a number of tools.

It is, therefore, an object of the present invention to provide a method of forming such guiding means which will overcome these drawbacks.

It is another object of this invention to provide a method of forming guiding arrangements for carriages on machine tools and the like which will be simple to practice.

These and other objects and advantages of the invention will appear more clearly from the following specification in connection with the accompanying drawing illustrating a section through an intermediate guiding member with the guiding means according to the invention and a portion of the carriage guided thereby.

Figure 1:
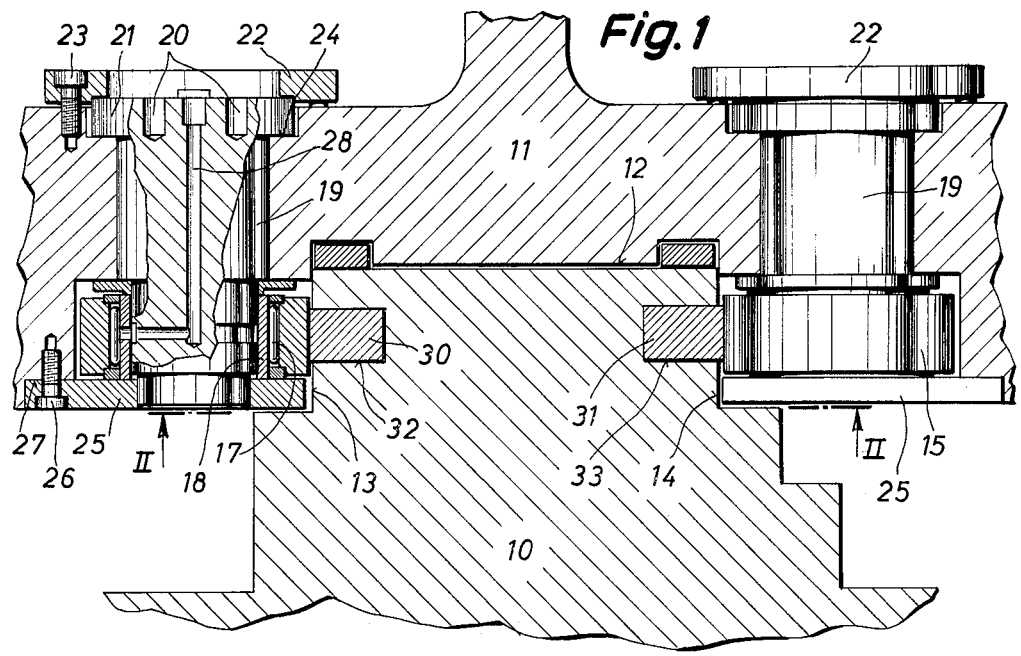
FIG. 1 is a cross sectional end view of guide surfaces for a carriage on a bed.
Figure 2:
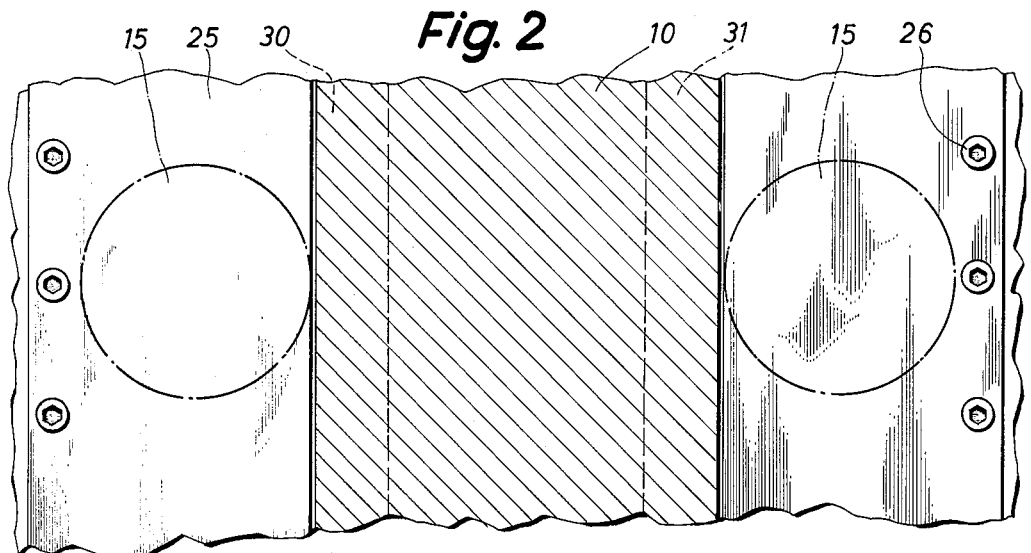
FIG. 2 is a top view of the carriage assembly.

The arrangement according to the invention is characterized primarily in that the intermediate guiding member has its two longitudinal sides each provided with at least one hardened steel rail. Advantageously, these steel rails may be inserted into the guiding member.

A satisfactory and safe connection of the guiding rails to the intermediate member may be obtained by gluing or adhesively connecting the steel rails into the guiding member. This may advantageously be effected by a two-component adhesive, such as F7 (German Patent No. 943,087) with the following specifications:

| | |
|---|---|
| Compressive strength | 1700 kg./cm.$^2$. |
| Impact strength | 10 cmkg./cm./$^2$. |
| Ball hardness | 1400 kg./cm.$^2$ (60 sec.). |
| Elastic module | 32,500 kg./cm. |
| Specific gravity | 1.2–1.6 (depending on quantity of filler used). |
| Shrinkage | 0.1%. |
| Heat resistance | 180° C. |
| Resistance to water, gasoline, alcohol, mineral oil, hydrochloric acid and sulphuric acid. | |

The installation of the steel rails is advantageously effected in such a way that first the steel rails are glued or adhesively mounted into the cast intermediate member and only then are ground to each other.

Referring now to the drawing in detail, the arrangement shown therein comprises a guiding member or bed 10 for guiding the carriage 11. To this end, the carriage 11 is so designed that it straddles the guiding member 10 in a manner known per se at the two lateral surfaces 13 and 14 while furthermore engaging the upper surface 12 of said guiding member 10. The lateral guiding in carriage 11 is effected by pressure rollers 15 which in a manner known per se may be arranged in the outer race ring 16 of an antifriction bearing body which by means of the needle bearing 17 is rotatable about the inner race ring 18. The inner race ring 18 is mounted on shafts 19 which in a manner known per se may be arranged eccentrically in carriage 11 in order to be able to adjust the pressure rollers 15 in a play-free manner. For purposes of adjusting the pressure rollers 15, one of the end faces of shaft 19 has bores 20 which may be engaged by a special wrench.

In order to prevent an accidental adjustment of the shafts 19, the latter are provided with a collar 21 which by means of a clamp ring 22 and screws 23 may be clamped against a shoulder 24 in the carriage 11. The bottom portion of the carriage 11 has connected thereto a retainer member 25 which by means of screws 26 is pressed against a shoulder 27. A lubricating passage 28 is provided for lubricating the pressure rollers.

The guiding member 10 is provided with lateral grooves 32, 33 into which are respectively inserted steel rails 30 and 31. In order to obtain a particularly good connection of these rails with the guiding member 10, the steel rails 30, 31 are glued or adhesively mounted into the respective grooves 32, 33 by means of an adhesive, such as described above. In order to assure that the glued-in steel rails in their final position will be precisely parallel to each other, the steel rails are first glued into the respective grooves and are ground only thereafter. This grinding is effected by means of a grinding carriage which is placed upon the machine bed. As a guiding means for the grinding carriage a steel rail of high precision may be employed which will be screwed onto the bed and along which the grinding carriage is guided. After one of the glued-in steel rails 30, 31 has been finished ground, it may also be employed as a guide for grinding the other steel rail. The screwed on rail can then be removed for use on other beds.

It will be obvious from the above that the arrangement according to the present invention represents a considerable saving in material and work over the heretofore known screwed on steel rails.

It is, of course, to be understood that the present invention is, by no means, limited to the particular construction shown in the drawing but also comprises any modifications within the scope of the appended claims.

What I claim is:
1. A method of providing guiding surfaces for a carriage on a bed, said bed having two longitudinally extending lateral surfaces, said method including the steps of: forming parallel outwardly facing grooves having unfinished surfaces in said lateral surfaces, mounting unfinished steel rails in said grooves and which rails protrude outwardly somewhat from the grooves, applying a two component adhesive to said rails and grooves for fixedly adhesively bonding said steel rails in place in said grooves, grinding the outer face of the protruding portion of one of said rails to a condition of parallelism with a predetermined reference line, and grinding the outer face of the portion of the other of said rails to a condition of parallelism with the said ground portion of said one rail.

2. A method of providing guide surfaces for a carriage on a bed, said bed having two longitudinally extending lateral surfaces, said method including the steps of: forming parallel outwardly facing grooves in said lateral surfaces, mounting hardened steel rails in said grooves and which protrude outwardly somewhat from the grooves, applying an adhesive to said rails and grooves for fixedly adhesively bonding said steel rails in place in said grooves, fixedly but detachably connecting a steel reference rail to said bed, grinding the outer face of the protruding portion of one of the steel rails to a condition of parallelism with said reference rail, grinding the protuding portion of the other steel rail to a condition of parallelism with the ground portion of said one steel rail, and removing said reference rail.

References Cited by the Examiner

UNITED STATES PATENTS

| | | | |
|---|---|---|---|
| 1,309,386 | 7/1919 | Yeomans | 29—445 |
| 1,473,659 | 11/1923 | Wolff | 184—5 |
| 1,697,773 | 1/1929 | Livermore | 29—445 |
| 1,919,323 | 7/1933 | Blum | 308—6 |
| 2,136,946 | 11/1938 | McCurdy | 29—149.5 |
| 2,220,210 | 11/1940 | Chace | 29—149.5 |
| 2,299,677 | 10/1942 | Bickel | 308—3 |
| 2,340,450 | 2/1944 | Bouschor | 308—3 |
| 2,522,695 | 9/1950 | Walter | 308—6 |
| 2,917,351 | 12/1959 | Frank et al. | 308—174 |
| 2,931,684 | 4/1960 | Johnson | 308—3 |
| 2,967,741 | 1/1961 | Bostelmann | 308—6 |
| 3,099,073 | 7/1963 | Olson. | |

FOREIGN PATENTS 525,170  8/1940  Great Britain.

WHITMORE A. WILTZ, *Primary Examiner.*

JACOB A. MANIAN, *Examiner.*